United States Patent
Shimbo et al.

[11] Patent Number: 5,671,010
[45] Date of Patent: Sep. 23, 1997

[54] APPARATUS FOR JUDGING THE ORDER OF ARRIVAL OF RACERS AT A GOAL IN A RACE AND THE TIME TAKEN FOR THE RACE, HAVING A PLURALITY OF LINE SENSOR CAMERAS

[75] Inventors: Naoyuki Shimbo, Urawa; Toshimichi Okada, Zama; Haruki Watanabe, Kodaira, all of Japan

[73] Assignee: Hitachi Denshi Kabushiki Kaisha, Tokyo, Japan

[21] Appl. No.: 442,992

[22] Filed: May 17, 1995

[30] Foreign Application Priority Data

May 20, 1994 [JP] Japan ............... 6-106410

[51] Int. Cl.$^6$ ............... H04N 7/18; H04N 9/74
[52] U.S. Cl. ............... 348/157; 348/222; 348/360; 348/399; 348/588; 368/9
[58] Field of Search ............... 348/157, 222, 348/360, 399, 588; 358/335; 368/9

[56] References Cited

U.S. PATENT DOCUMENTS

| | | | |
|---|---|---|---|
| 2,943,141 | 6/1960 | Knight | 348/157 |
| 3,678,189 | 7/1972 | Oswald | 348/157 |
| 4,743,971 | 5/1988 | Hugli | 348/157 |
| 4,797,751 | 1/1989 | Yamaguchi | 358/335 |
| 5,103,433 | 4/1992 | Imhof | 368/9 |
| 5,136,283 | 8/1992 | Nobs | 348/157 |
| 5,493,331 | 2/1996 | Takahashi et al. | 348/157 |

FOREIGN PATENT DOCUMENTS

| | | |
|---|---|---|
| 24831 | 7/1980 | Japan . |
| 139374 | 6/1991 | Japan . |

*Primary Examiner*—Howard W. Britton
*Assistant Examiner*—Frank Snow
*Attorney, Agent, or Firm*—Antonelli, Terry, Stout & Kraus, LLP

[57] ABSTRACT

Apparatus for judging the order of arrival of racers at a goal in a race and the time taken for the race, capable of storing, in a memory unit, video signals of a plurality of line sensor cameras disposed so as to be able to pick up images of moving objects from both directions with a judging criterion line between or from such angles that moving objects do not overlap, effecting scan conversion on the stored video signals of the plurality of line sensor cameras, reading resultant video signals, and displaying video signals thus read out respectively singly or simultaneously plurally on a single video monitor.

21 Claims, 9 Drawing Sheets

APPARATUS FOR JUDGING THE ORDER OF ARRIVAL OF RACERS AT A GOAL IN A RACE AND THE TIME TAKEN FOR THE RACE, HAVING A PLURALITY OF LINE SENSOR CAMERAS

CROSS-REFERENCE TO RELATED APPLICATION

The present application relates to subject matter described in application Ser. No. 08/215,731 filed Mar. 22, 1994 entitled "Apparatus for Judging the Order of Arrival of Racers at a Goal in a Race and the Time taken for the Race, Using Color Image Pickup" by Takahaki et al., the disclosure of which is hereby incorporated by reference, now U.S. Pat. No. 5,493,331.

BACKGROUND OF THE INVENTION

The present invention relates to an apparatus for judging the order of arrival of racers at a judgment criterion line such as a goal line in a race and time taken for the race, having television cameras using line sensors.

The order-of-arrival and time judging apparatus having a television camera picks up images of moving objects passing a judgment criterion line such as a goal line by using a line sensor camera accurately aligned with the judgment criterion line, inputs a one-dimensional video signal outputted from the line sensor camera into a storage unit having a scan conversion function, records the one-dimensional video signal together with character information required for judging the order of arrival of racers at a goal in a race, effects scan conversion on the one-dimensional video signal to obtain a two-dimensional video signal, reads out the two-dimensional video signal from the storage unit together with character information required for judging the order of arrival of racers at a goal in a race, outputs the two-dimensional video signal and the character information to a video monitor, and displays images required for judgment on the video monitor.

The order-of-time and time judging apparatus is used in a speedboat race, horse race, bicycle race, athletic sports or the like. Moving objects such as boats, horses, bicycles, or runners often arrive at a judgment criterion line such as a goal line in a body. However, a conventional order-of-time and time judging apparatus picks up images of a plurality of moving objects passing a judgment criterion line by using a single line sensor camera, records a video signal outputted from the line sensor camera in a storage unit, effects scan conversion on the video signal and reads out the video signal, and displays the video signal on a video monitor to bring a judgment as to the order of arrival of racers at a goal in a race and the time taken for the race. In the case where a plurality of moving objects pass a judgment criterion line with minor differences in time, therefore, moving objects overlap each other and it is unadvantageously difficult to form a judgment as to the order of arrival of racers at a goal in a race and the time taken for the race.

Conventional techniques include the technique disclosed in JP-B-55-24831 and an improved technique thereof disclosed in JP-A-3-139374.

Figure 9:
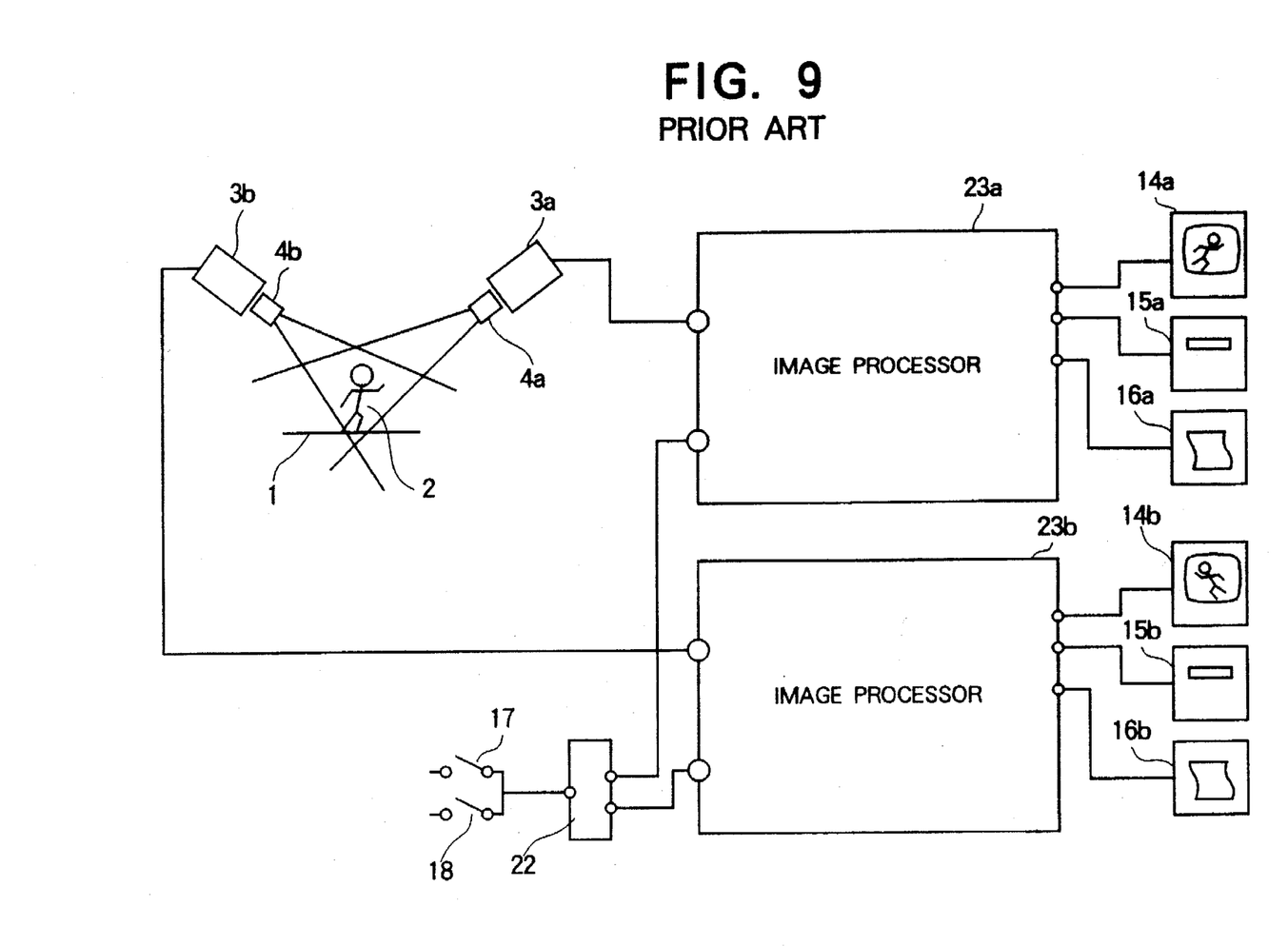
FIG. 9 is a block diagram of a system using a plurality of order-of-arrival and time judging apparatuses according to a conventional technique.

If it is attempted to implement a judgment as to the order of arrival of racers at a goal in a race and the time taken for the race by picking up images from a plurality of directions according to the conventional techniques, it is necessary to install a plurality of apparatuses configured respectively independently to judge the order of arrival of racers at a goal in a race and the time taken for the race as shown in FIG. 9. Therefore, the system cost is largely increased. In addition, on a plurality of display units, i.e., on video monitors 14a and 14b, video images obtained from image processors 23a and 23b by effecting processing on video images supplied from respective line sensor cameras 3a and 3b are displayed. In a judgment, therefore, respective screens must be watched while operating respective order-of-arrival and time judging apparatuses. As a result, very complicated works are needed.

Furthermore, as for image filing and printing of images for judgment as well, a plurality of image filing units 15a and 15b and a plurality of video printers 16a and 16b are needed. Images for judgment cannot be administered unitarily. Therefore, the conventional apparatus is not practical as the order-of-arrival and time judging apparatus.

SUMMARY OF THE INVENTION

An object of the present invention is to provide an apparatus for judging the order of arrival of racers at a goal in a race and the time taken for the race, having a plurality of line sensor cameras and capable of storing, in a memory unit, video signals of a plurality of line sensor cameras disposed so as to be able to pick up images of moving objects from both directions with a judgment criterion line such as a goal line between or from such angles that moving objects do not overlap, effecting scan conversion on the video signals, reading resultant video signals, and displaying video signals thus read out respectively singly or simultaneously plurally on a single display unit such as a single video monitor.

Another object of the present invention is to provide an inexpensive apparatus for judging the order of arrival of racers at a goal in a race and the time taken for the race, whereby unitary administration of images for judgment in a single image filing unit and a single video printer can be implemented and a judgment as to the order and time of arrival of racers at a goal in a race can be formed accurately, positively and easily.

In order to achieve the above described objects, an apparatus for judging the order of arrival of racers at a goal in a race and the time taken for the race, having line sensor cameras, an image processor and a video monitor according to the present invention includes a plurality of line sensor cameras disposed so as to pick up images of moving objects passing a judgment criterion line from both directions with the judgment criterion line between or from different angles, an image processor for storing a plurality of video signals supplied from the line sensor cameras, effecting scan conversion on the video signals, and reading out and outputting resulting video signals as a single combined video signal or individual video signals, an operating unit for operating selection of at least signal storing and reading in the image processor, and a video monitor for displaying an image of a single video signal obtained by combining a plurality of video signals inputted from the image processor or images respectively of a plurality of video signals.

In particular, in an apparatus for judging the order of arrival of racers at a goal in a race and the time taken for the race according to the present invention, the image processor includes a plurality of A/D converters, a plurality of write circuits, a memory unit, a read circuit, an address controller, and a central processing unit.

An apparatus for judging the order of arrival of racers at a goal in a race and the time taken for the race, having line sensor cameras, an image processor and a video monitor according to the present invention includes two line sensor cameras disposed so as to pick up images of moving objects passing through a judgment criterion line from both directions with said judgment criterion line between or from different angles and so as to have mutually different optical axes and mutually divide respective angles of view in the height direction with predetermined ratios, a video signal combining unit for combining two video signals inputted from the two line sensor cameras, an image processor for storing the combined video signal inputted from the video signal combining unit and reading and outputting the combined video signal as a combined video signal subjected to scan conversion, an operating unit for operating selection of at least signal storing and reading in the image processor, and a video monitor for displaying an image of a single video signal obtained by combining video signals of two line sensor cameras.

An apparatus for judging the order of arrival of racers at a goal in a race and the time taken for the race, having line sensor cameras, an image processor including a time generator and a character generator, and a video monitor according to the present invention includes a plurality of line sensor cameras disposed so as to pick up images of moving objects passing a judgment criterion line from both directions with the judgment criterion line between or from different angles, an image processor for storing a plurality of video signals supplied from the line sensor cameras, effecting scan conversion on the video signals, reading out resulting video signals as a single combined video signal or individual video signals, and storing, reading out, and outputting information signals supplied from the time generator and the character generator simultaneously with storing and reading of the video signals, an operating unit for operating selection of at least means for signal storing and reading in the image processor, and a video monitor for displaying an image of a single video signal obtained by combining a plurality of video signals inputted from the image processor or images respectively of a plurality of video signals, together with an image of information signals.

DESCRIPTION OF THE PREFERRED EMBODIMENTS

A first embodiment of an apparatus for judging the order of arrival of racers at a goal in a race and the time taken for the race, according to the present invention will now be described by referring to FIGS. 1 through 6.

Figure 1:
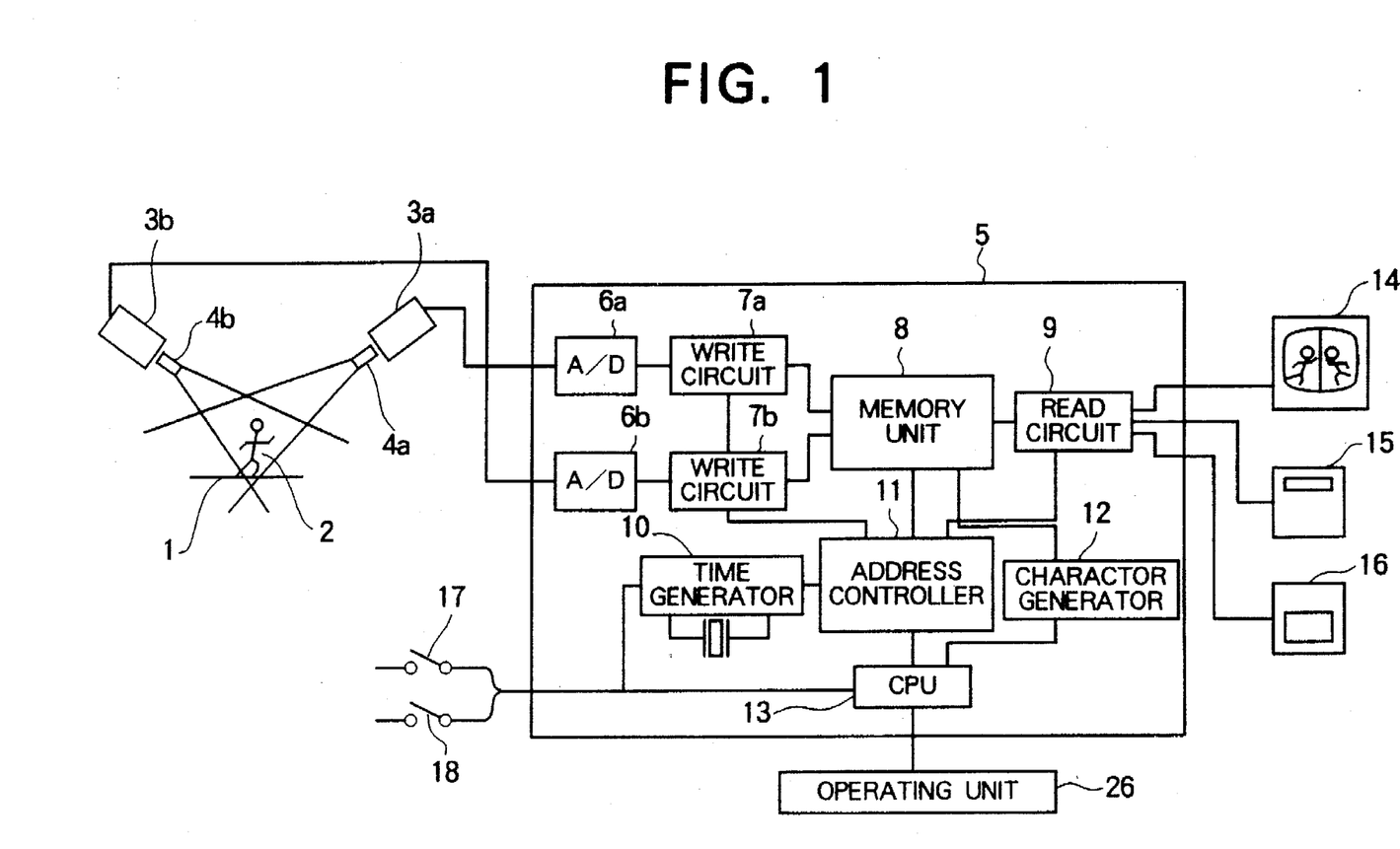
FIG. 1 is a block diagram of an order-of-arrival and time judging apparatus according to the present invention in the case where two line sensor cameras are used.

FIG. 1 is a block diagram of an apparatus for judging the order of arrival of racers at a goal in a race and the time taken for the race, in the case where two line sensor cameras $3a$ and $3b$ are used. In FIG. 1, numeral 1 denotes a judgment criterion line such as a goal line, and numeral 2 denotes a moving object such as a runner passing the judgment criterion line. The line sensor cameras $3a$ and $3b$ are disposed opposite each other over the judgment criterion line 1 in order to successively pick up one-dimensional images along a line perpendicular to the judgment criterion line. Numeral 5 denotes an image processor. The image processor 5 effects image processing on video signals picked up by the line sensor cameras $3a$ and $3b$, writes the video signals into a memory unit 8, and then reads out the video signals. Numeral 26 denotes an operating unit for ordering or selecting operation of the image processor 5. Numeral 14 denotes a video monitor, 15 an image filing unit, and 16 a video printer.

The image processor 5 will now be described in more detail. Characters $6a$ and $6b$ denote A/D converters for converting video signals outputted from the line sensor cameras $3a$ and $3b$ into digital signals. Characters $7a$ and $7b$ denote write circuits for storing digital video signals in a memory. Numeral 8 denotes a memory unit for storing digital video signals and digital information signals. Numeral 9 denotes a read circuit for effecting scan conversion on digital video signals and digital information signals stored in the memory unit 8 and reading them. Numeral 10 denotes a time generator. Numeral 11 denotes an address controller for controlling the write operation and read operation for the memory unit 8. Numeral 12 denotes a character generator. Numeral 13 denotes a central processing unit (hereafter referred to as CPU). In FIG. 1, the A/D converters $6a$ and $6b$ are included in the image processor 5, but the A/D converters $6a$ and $6b$ are omitted, in case the line sensor cameras $3a$ and $3b$ include A/D converters therein, respectively.

Among two line sensor cameras for picking up images of a moving object 2 passing a judgment criterion line 1, the line sensor camera $3a$ is disposed on an extension line of the judgment criterion line 1 to pick up images of the judgment criterion line 1 from the outfield side. The line sensor camera $3b$ is disposed to pick up images of the judgment criterion line 1 from the infield side.

Images of a subject, i.e., images of the moving object 2 passing the judgment criterion line 1 are picked up by using the lenses $4a$ and $4b$. At periods of 0.5 ms, for example, one-dimensional video signals are derived by respective line sensor cameras $3a$ and $3b$.

Video signals respectively of the line sensor cameras $3a$ and $3b$ are outputted to the image processor 5. In a manner described later, respective video signals are converted to digital video signals by A/D converters $6a$ and $6b$. Digital video signals supplied from two line sensor cameras are simultaneously written into the memory unit 8 and stored therein via the write circuits $7a$ and $7b$.

Simultaneously with storing the digital video signals supplied from the line sensor cameras 3a and 3b, the memory unit 8 also stores digital information signals supplied from the time generator 10 and the character generator 12. The time generator 10 functions to super-impose time elapsed since start, for example, on displayed images. The character generator 12 functions to superimpose characters, symbols and judgment criterion line on images.

On the basis of portions required for order-of-arrival and time judgment and specified by the operating unit 26 out of digital video signals and digital information signals stored in the memory unit 8, the read circuit 9 reads out two-dimensional video signals and information signals and outputs them to the video monitor 14.

On the basis of the two-dimensional video signals and information signals inputted from the read circuit 9, the video monitor 14 displays images required for judging the order of arrival of racers at a goal in a race and the time taken for the race.

On the basis of control signals of the address controller 11, the write circuits 7a and 7b, the memory unit 8, the read circuit 9, and the like are controlled so as to conform to the number of connected line sensor cameras and so as to conform to the division mode of the memory. Various controls such as recording of signals such as video signals and information signals and read selection issued from the operating unit 26, and control of the entire apparatus are administered by the CPU 13. As signals supplied from the outside, there are a reference timer start signal 17 of a starter's gun for starting racers and a memory fetch signal 18. In response to sensing the moving object 2 effected by a sensor disposed before the judgment criterion line, the memory fetch signal 18 is supplied to make the memory unit 8 start storage operation. Start of the storage operation of the memory unit 8 can be ordered by the operating unit as well.

Figure 2:
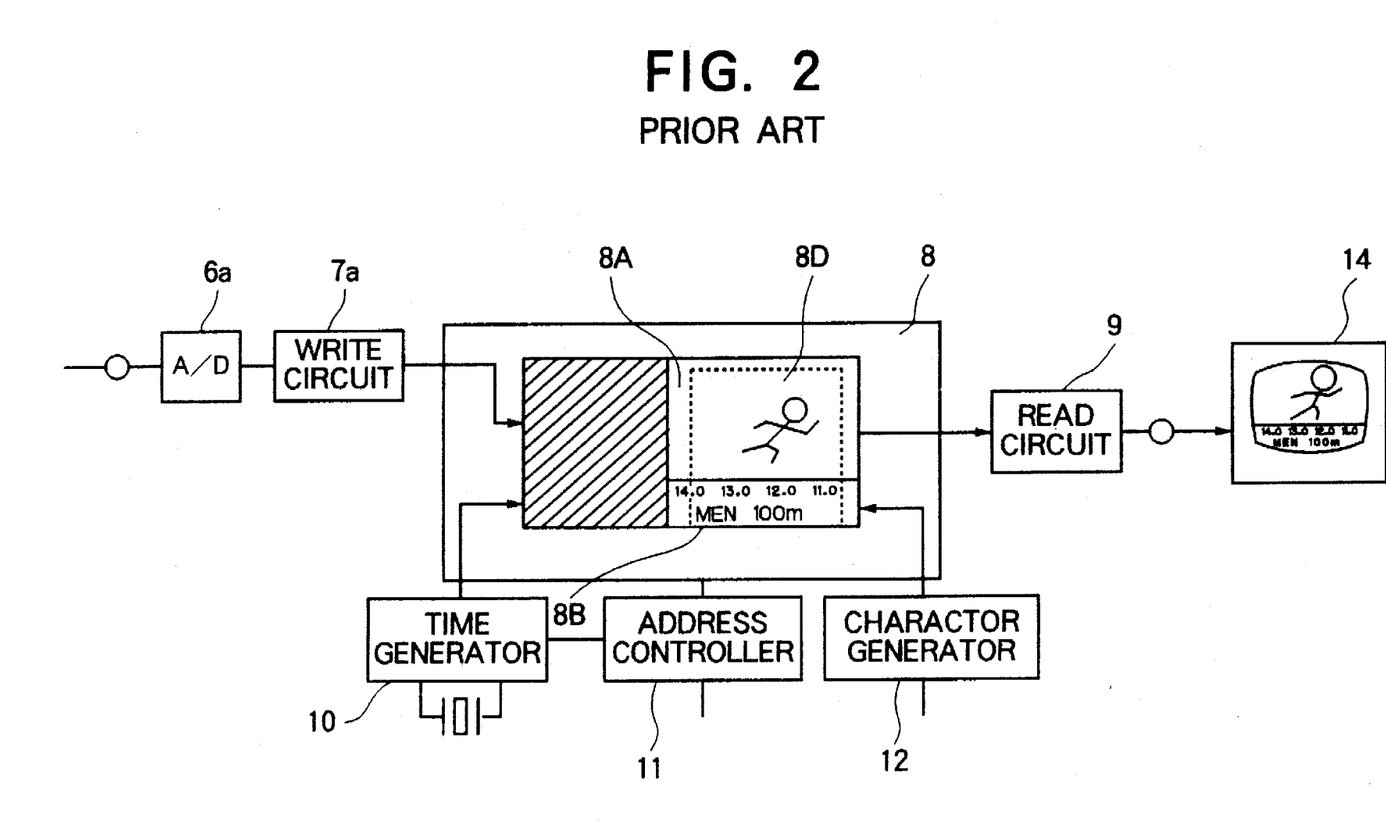
FIG. 2 is a diagram illustrating the operation of an image memory of a conventional order-of-arrival and time judging apparatus, using a single line sensor camera.

The concept of storage, in the image processor 5 including the memory unit 8 as a principal component, of the video signal picked up by the line sensor camera will now be described by referring to FIG. 2 for the case of conventional technique using the video signal of a single line sensor camera and by referring to FIG. 3 for the case of the present invention using video signals of two line sensor cameras.

In the case of the conventional technique using a video signal of a single line sensor camera, control is effected by the order signal or the selection signal supplied from the operating unit 26 to input the video signal alternately to an image memory 8A and an image memory 8B included in the memory unit 8 every other line. The time of the one-dimensional digital video signal of the moving object 2 passing the judgment criterion line 1 is measured by the time generator 10. The video signal is stored in the memory in a time series, successively starting from a memory end, together with the time elapsed since the reception time of the timer start signal 17 and digital information signal such as the event of the race and the title supplied from the character generator 12.

A digital information signal relating to the digital video signal included in the stored digital video signal and associated with an image 8D required for judgment is read out into the read circuit 9. An image of the video signal subjected to scan conversion so as to conform to a television system is displayed on the video monitor 14.

The digital video signal successively stored in the memory unit 8 in a time series is a digital video signal scanned in the vertical direction and supplied from the line sensor camera. As for an image 8D shown in FIG. 2, therefore, the digital video signal formed by vertical scanning thereof is subjected to scan direction conversion so as to result in horizontal scanning as in standard television systems and displayed on the video monitor 14. For example, the read circuit 9 has an image memory in itself. An image part desired to be displayed on the video monitor 14 is selected and specified by the operating unit 26, read out from the memory unit 8, and stored in the image memory included in the read circuit 9. The video signal stored in the image memory is displayed on the video monitor 14 according to a standard television system. If a dual port memory is used in the memory unit 8, the write operation and the read operation can be executed simultaneously and independently. By effecting vertical scanning on the writing side and effecting horizontal scanning on the reading side, therefore, scan conversion can be achieved.

The video monitor 14 may be replaced by a video monitor whose the scanning is vertical scanning different from the standard television system. In the case, since the video monitor 14 has the same scanning direction as the line sensor cameras, the video monitor can display the judgement image 8D under the same scanning period as that of the line sensor cameras.

According to an embodiment of the present invention, video signals supplied from two line sensor cameras are used. By a selection signal supplied from the operating unit 26, an image memory 8A included in the memory unit 8 is bisected in a position of a division line 8E to form image memories 8Aa and 8Ab as shown in FIG. 3. An information memory 8B included in the memory unit 8 is also bisected in a position of a division line 8E to form information memories 8Ba and 8Bb. Images of the moving object 2 passing the judgment criterion line 1 are picked up simultaneously by the cameras 3a and 3b. Digital video signals obtained from those cameras are stored in respective memories 8Aa and 8Ab successively from both sides. At the same time, the time elapsed since start caused by the timer start signal 17 of the time generator 10 and a digital information signal such as the event of the race and the title supplied from the character generator 12 are also stored together with the digital video signals.

A more concrete method for writing signals into the memory unit 8 will now be described. The address controller 11 outputs two horizontal addresses to the memory unit 8. One horizontal address is used to write the video signal supplied from the camera 3a. The other horizontal address is used to write the video signal supplied from the camera 3b. Furthermore, the address controller 11 outputs two vertical addresses to the memory unit 8. One vertical address is used in common to write video signals supplied from the cameras 3a and 3b. The other vertical address is used to write information signals supplied from the time generator 10 and the character generator 12. As for the horizontal address for writing information signals, the above described two horizontal addresses are both used.

Figure 3:
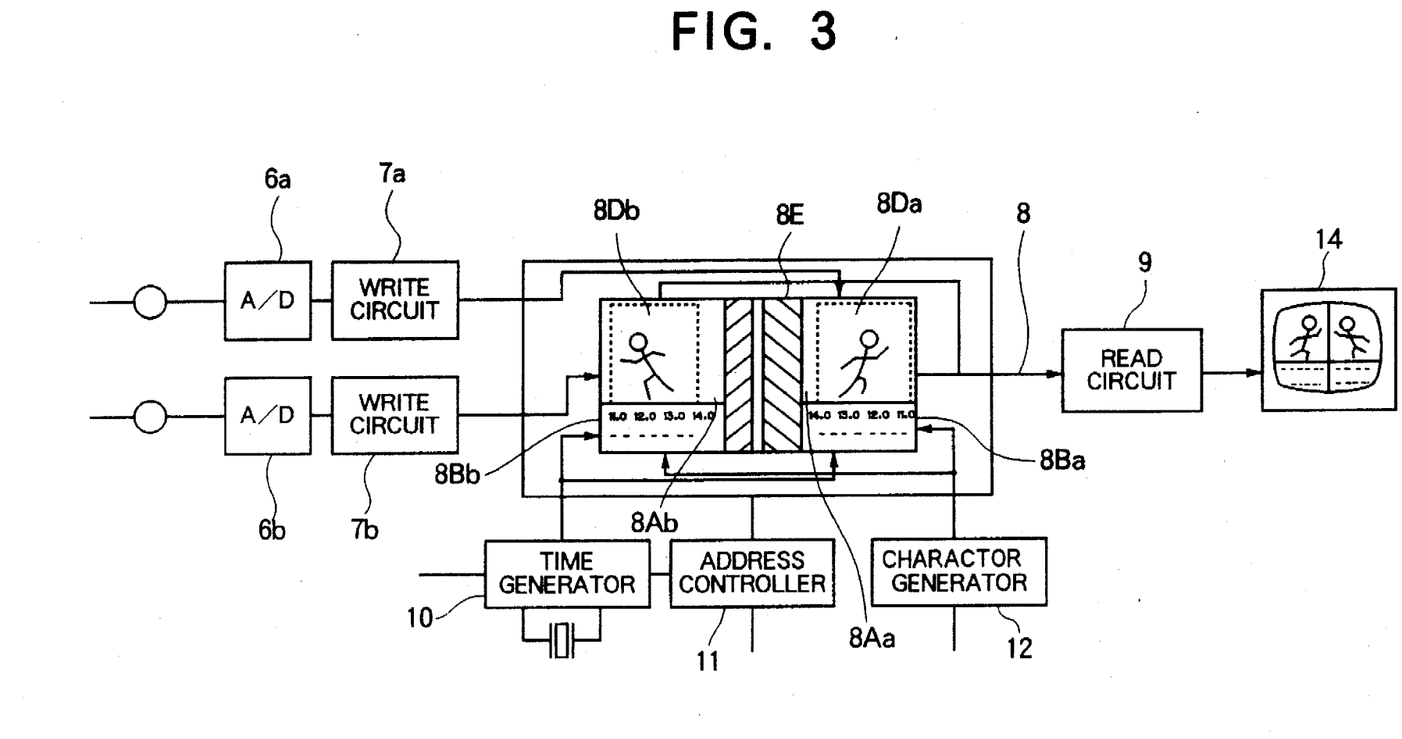
FIG. 3 is a diagram illustrating the operation of an image memory bisected into a left half and a right half and included in an order-of-arrival and time judging apparatus according to the present invention.

In one image memory 8Aa and one information memory 8Ba obtained by bisection, therefore, the one-dimensional digital video signal supplied from the outfield line sensor camera 3a and the digital information signal such as the elapsed time and the event are stored successively in a time series, starting from the right side shown in FIG. 3. In the other image memory 8Ab and the other information memory 8Bb obtained by bisection, therefore, the one-dimensional digital video signal supplied from the infield line sensor camera 3b and the digital information signal such as the elapsed time and the event are stored successively in a time series, starting from the left side shown in FIG. 3.

Out of the digital video signals and digital information signals stored in the bisected image memories 8A$a$ and 8A$b$ and the bisected information memories 8B$a$ and 8B$b$, the digital video signal required for judgment and the related information signal are specified by the operating unit 26 and read out into the image memory included in the read circuit 9 as one combined video signal. The image memory included in the read circuit 9 is subjected to horizontal scanning and the image of the video signal is displayed on the video monitor 14. In order to make a display so as to conform to the number of dots which can be used by the video monitor 14 to display an image and without reducing the size of the moving object 2 itself, the image picked up by each line sensor camera and stored in the memory unit is cut by half in lateral width and respective images are read out. The two images are combined and displayed on the video monitor 14 so as to be displayed separately on the left side and on the right side as shown in FIG. 3. Furthermore, depending on the purpose, the image displayed on the video monitor 14 may be compressed or expanded by thinning the video signal at the time of reading or reading one pixel twice. Such image combining, expansion and compression can be implemented by using well known image processing techniques.

In order to achieve the object of comparing the image of the infield camera with the image of the outfield camera at the same time when two images are combined and displayed on the video monitor 14, the address controller 11 for reading out an arbitrary digital video signal specifies the read address of each memory by taking the time elapsed since start caused by the timer start signal as reference and on the basis of specification via the operating unit 26. Assuming now that images required for judgment are picked up between 10.0 second and 13.5 second of time of the outfield camera, for example, specification is effected so as to also display images picked up by the infield camera between the same 10.0 second and 13.5 second.

Figure 4A:
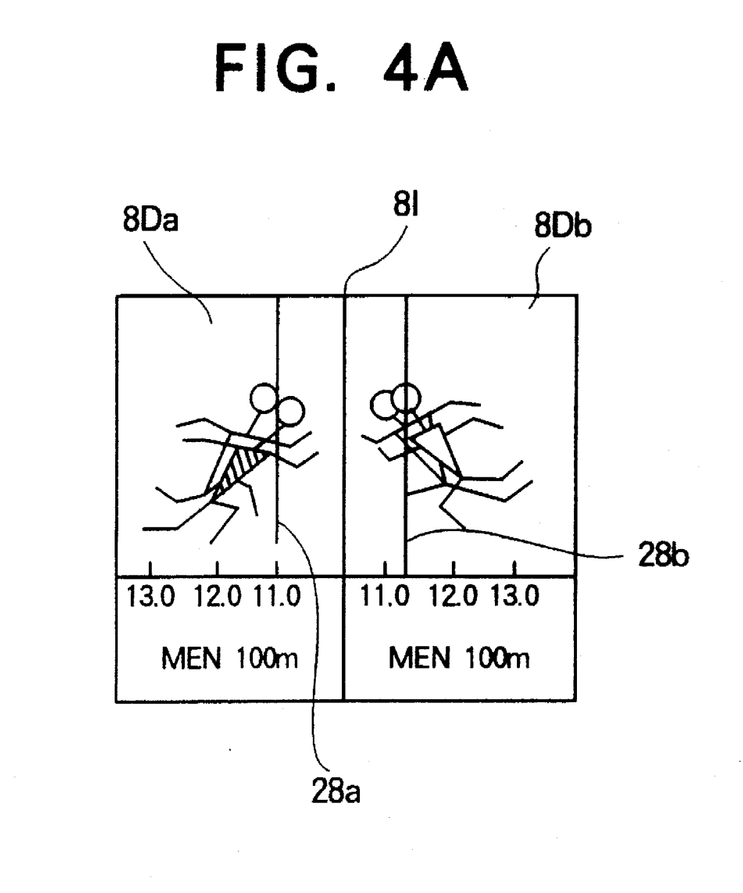
FIGS. 4A and 4B are diagrams illustrating examples of a display on a screen of an order-of-arrival and time judging apparatus according to the present invention.

For example, images for judgment displayed on the video monitor 14 of the case where two runners arrive at a goal nearly at the same time are shown in FIG. 4A. (This poses a problem in the conventional order-of-arrival and time judging apparatus, using a single line sensor camera.) On the left side of a division line 8I of the video monitor 14, the image picked up the outfield line sensor camera 3$a$ is displayed. On the right side of the division line 8I, the image picked up by the infield line sensor camera 3$b$ is displayed.

First of all, the operating unit 26 is operated to align a judgment line 28$a$ with the breast of a runner of this side of an image 8D$a$ picked up by the outfield line sensor camera 3$a$ and displayed on the left side. Thereafter it is desired to judge the goal time of the runner of the far side. Since the runner of the far side and the runner of this side overlap each other, the accurate goal time cannot be judged. Therefore, a judgment is formed by watching an image 8D$b$ picked up by the infield line sensor camera 3$b$ and displayed on the right side. In the image displayed on the right side, the runner of the far side in the image displayed on the left side is located on this side. Although in the image displayed on the left side the time cannot be judged because of overlapping, therefore, accurate time can be judged by aligning a judgment line 28$b$ with the breast of the runner in the image displayed on the right side.

It is now assumed that the image for judgment is scrolled on the screen of the video monitor 14 in the time axis direction. If the left screen is scrolled in the positive direction of time axis, for example, with the division line 8I located in the center of the screen of the video monitor 14 taken as the boundary, the right screen is also scrolled in the positive direction of time axis. That is to say, the left and right images are scrolled in mutually opposite directions. At all times, images for judgment of the same time are displayed on the left and right screens of the video monitor 14.

Figure 4B:
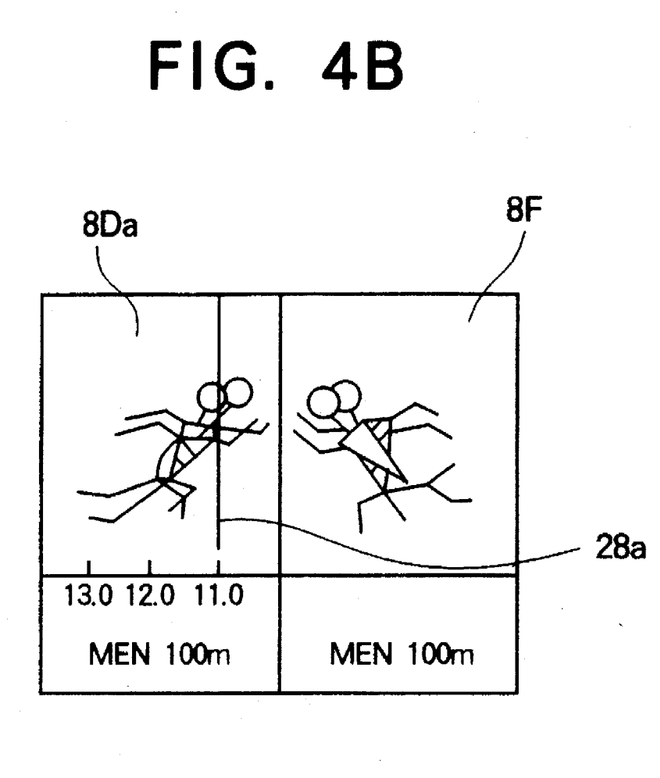

Another example of application in the case where the apparatus is used in a sports ground is shown in FIG. 4B.

It is now assumed that two line sensor cameras are installed in an outfield and an infield of a sports ground. A slight optical deviation is caused, for example, in the case where the line sensor cameras are different in pickup distance or installation height, in the case where a goal line is picked up by lenses of different angles of view and different optical systems, or in the case where the line sensor cameras are not installed completely over a line extended from the goal line functioning as a judgment criterion line. If there is such an optical deviation or a deviation caused by vibration, an error may be caused. The magnitude of the error is close to the distance the subject 2 travels during the scanning period of the line sensor cameras, or close to a fraction thereof. Or an error close to one scanning interval may be caused in images picked up by the outfield line sensor camera 3$a$ and the infield line sensor camera 3$b$.

If runners in both the left and right images described by referring to FIG. 4A are judged by using the judgment lines 28$a$ and 28$b$ under the existence of such an error, a difference is generated in goal time even if the time of the same subject 2 is judged. For the purpose of avoiding occurrence of such a judgment error, the function of specifying a primary camera and limiting the time judgment function of secondary cameras is indispensable to a judgment apparatus capable of displaying images of a plurality of cameras on the same video monitor screen.

It is now assumed that the outfield line sensor camera 3$a$ is used as the primary camera whereas the infield line sensor camera 3$b$ is used as the secondary camera. It is also assumed that the elapsed time is not displayed in the image of the secondary camera. FIG. 4B shows images of the video monitor 14 in such a case. In this case, an image 8F picked up by the infield line sensor camera 3$b$ is used not for the purpose of judging the goal time but for the purpose of judging the order of arrival of racers at a goal in a race. The goal time is judged on the basis of the image 8D$a$ picked up by the outfield line sensor camera 3$a$ functioning as the primary camera.

Figure 5:
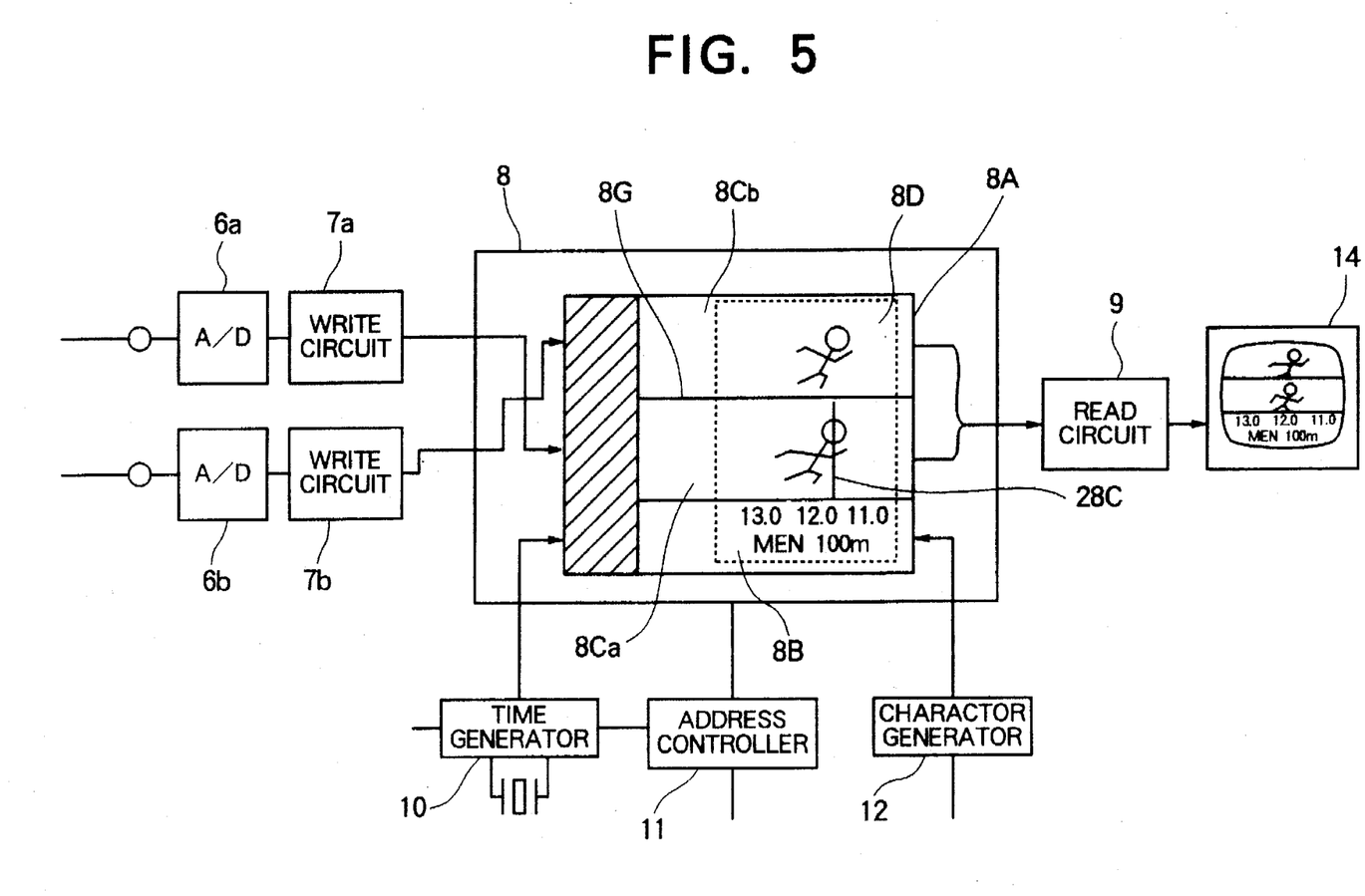
FIG. 5 is a diagram illustrating the operation of an image memory bisected into an upper half and a lower half and included in an order-of-arrival and time judging apparatus according to the present invention.

Another embodiment will now be described. In this embodiment, each of the image memory 8A and the information memory 8B is not divided into a left part and a right part by a division line as shown in FIG. 3. As shown in FIG. 5, the image memory 8A included in the memory unit 8 is divided by a division line 8G into an upper image memory 8C$a$ and a lower image memory 8C$b$. Thus two digital video signal inputs can be stored simultaneously. In the case of the present invention, it is not necessary to divide the information memory 8B for the elapsed time, event, and title.

Digital video signals supplied from the line sensor cameras 3$a$ and 3$b$ for simultaneously picking up images of the moving object 2 passing the judgment criterion line 1 are respectively stored in memories 8C$a$ and 8C$b$ obtained by dividing a memory into upper and lower halves with the division line 8G. The total number of pixels of each memory obtained by division in the longitudinal axis direction is reduced to half. If the division ratio is 1/2, therefore, each of digital video signals of the two line sensor cameras 3$a$ and 3$b$ is sampled at a ratio of 1/2 and then stored.

In this case, the address controller 11 supplies one horizontal address and a plurality of vertical addresses to the memory unit 8. The horizontal address is used in common to write video signals supplied from the cameras 3a and 3b and information signals supplied from the time generator 10 and the character generator 12. Among a plurality of vertical addresses, a first vertical address, a second vertical address and a third vertical address are used to specify storage addresses in the vertical direction for the video signal supplied from the camera 3a, the video signal supplied from the camera 3b and the information signals, respectively. Alternatively, one more vertical address may be prepared. In this case, the third vertical address is used to store the information signal supplied from the time generator 10, and the fourth vertical address is used to store the information signal supplied from the character generator 12.

In the case where the image of the outfield line sensor camera is used as the primary image, the ratio of division is arbitrary. For example, two thirds of the longitudinal axis is allocated to the image of the outfield line sensor camera and remaining one third is allocated to the image of the infield line sensor camera for the purpose of displaying the primary image with a larger size.

As for the digital video signals thus stored in the memory, the time elapsed since start caused by the timer start signal and information such as event and title are common to the outfield and infield as shown in FIG. 5. If images are displayed respectively in the upper screen and the lower screen with information shared, therefore, comparison and judgment are facilitated.

In the above described case where an error is caused due to presence of two line sensor cameras, a judgment line 28C is displayed in only the primary screen so as to make it possible to judge the goal time by watching only the primary screen and the secondary screen does not display the judgment line and is used only for judging the order of arrival of racers at a goal in a race.

Unlike the direction of the image picked up by the infield line sensor camera as shown in FIG. 3, a display is made so as to make the travelling direction of the moving object in the image picked up by the infield line sensor camera identical with that of the moving object in the image picked up by the outfield line sensor camera as shown in FIG. 5. This aims at facilitating watching in judgment. As a matter of course, such a display having the same travelling direction can be made also in the case where the memory is divided into a left part and a right part (as in the embodiment shown in FIG. 3).

Figure 6:
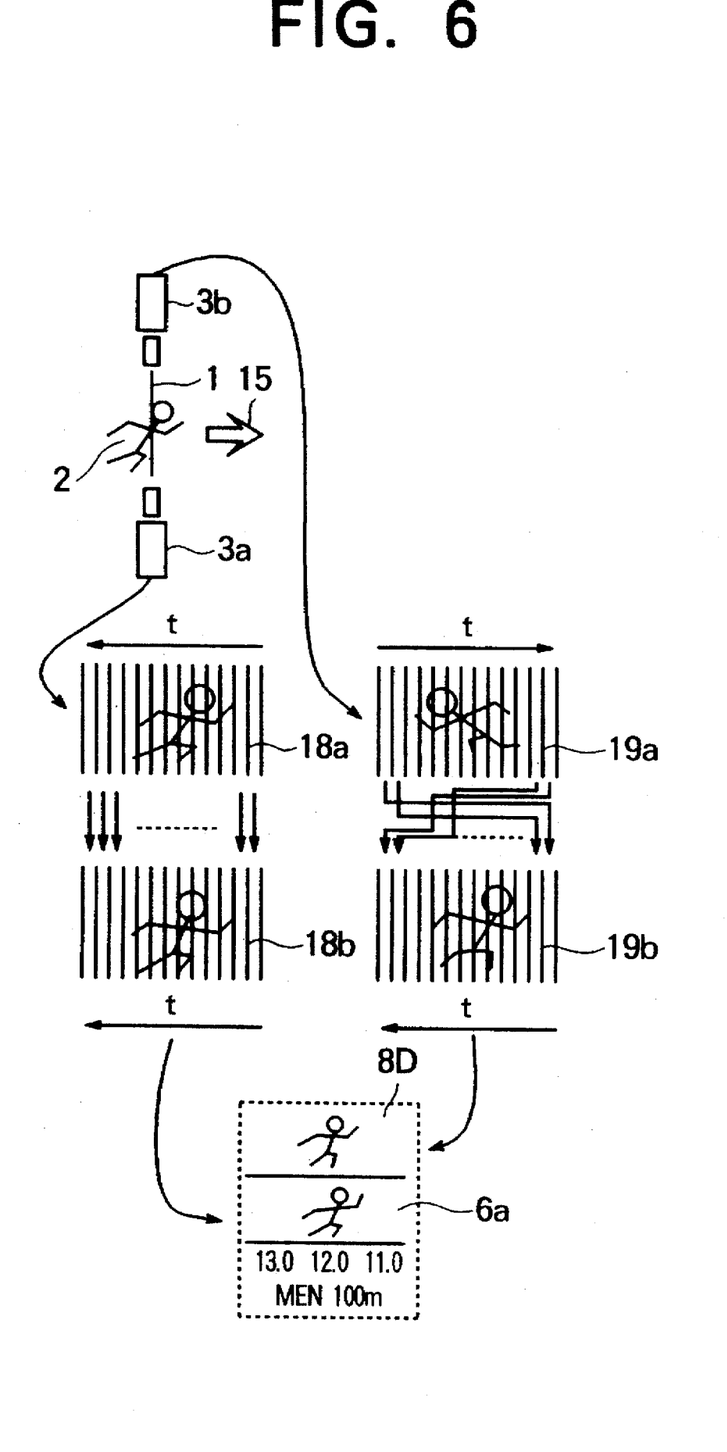
FIG. 6 is a diagram illustrating the operation of horizontal image inversion in an order-of-arrival and time judging apparatus according to the present invention.

Means for making a display so as to make the travelling direction of the outfield line sensor camera identical with that of the infield line sensor camera will now be described by referring to FIG. 6.

If images of the moving object 2 passing the judgment criterion line 1 picked up by the line sensor cameras 3a and 3b from both sides of the judgment criterion line 1 are watched at intervals of the scanning period of a standard television system with respect to the time axis t, then video signal outputs supplied from the line sensor cameras 3a and 3b form images facing opposite each other as represented by images 18a and 19a.

Out of these images 18a and 19a, the image 19a picked up by the infield line sensor camera 3b is rearranged by effecting address operation so as to make the direction of the time axis t identical with the direction of the image picked up by the outfield line sensor camera 3a and stored in the memory as a video signal 19b.

As described above, the time axis direction is made identical by effecting address operation and resultant images are stored in the memory. However, video signals 18b and 19b are not stored as they are. Instead, as described above, the images 18b and 19b are compressed to half, for example, in vertical size, displayed respectively in the upper part and the lower part to make a combined display, and stored as represented by an image 6a. This corresponds to the image 8D stored in the memory shown in FIG. 5. This is displayed on the video monitor 14 via the read circuit 9.

It is to be noted the image of the infield line sensor camera resembles an image obtained by mirror inversion and characters such as numbers of moving objects such as runners are seen reversely. However, this does not pose any problem in practical use because the infield line sensor camera is a camera for judging the order of arrival.

By referring to FIG. 7, a second embodiment of an order-of-arrival and time judging apparatus will now be described.

In the order-of-arrival and time judging apparatus described before by referring to FIG. 5, dividing the screen into an upper part and a lower part is effected by changing the sampling range of the image when video signals are stored in the memory. Alternatively, the images of the moving object may be respectively picked up by two line sensor cameras with mutually different pickup ranges. Those video signals are combined to have a form divided into an upper part and a lower part and stored in the memory unit as shown in FIG. 7.

Figure 7:
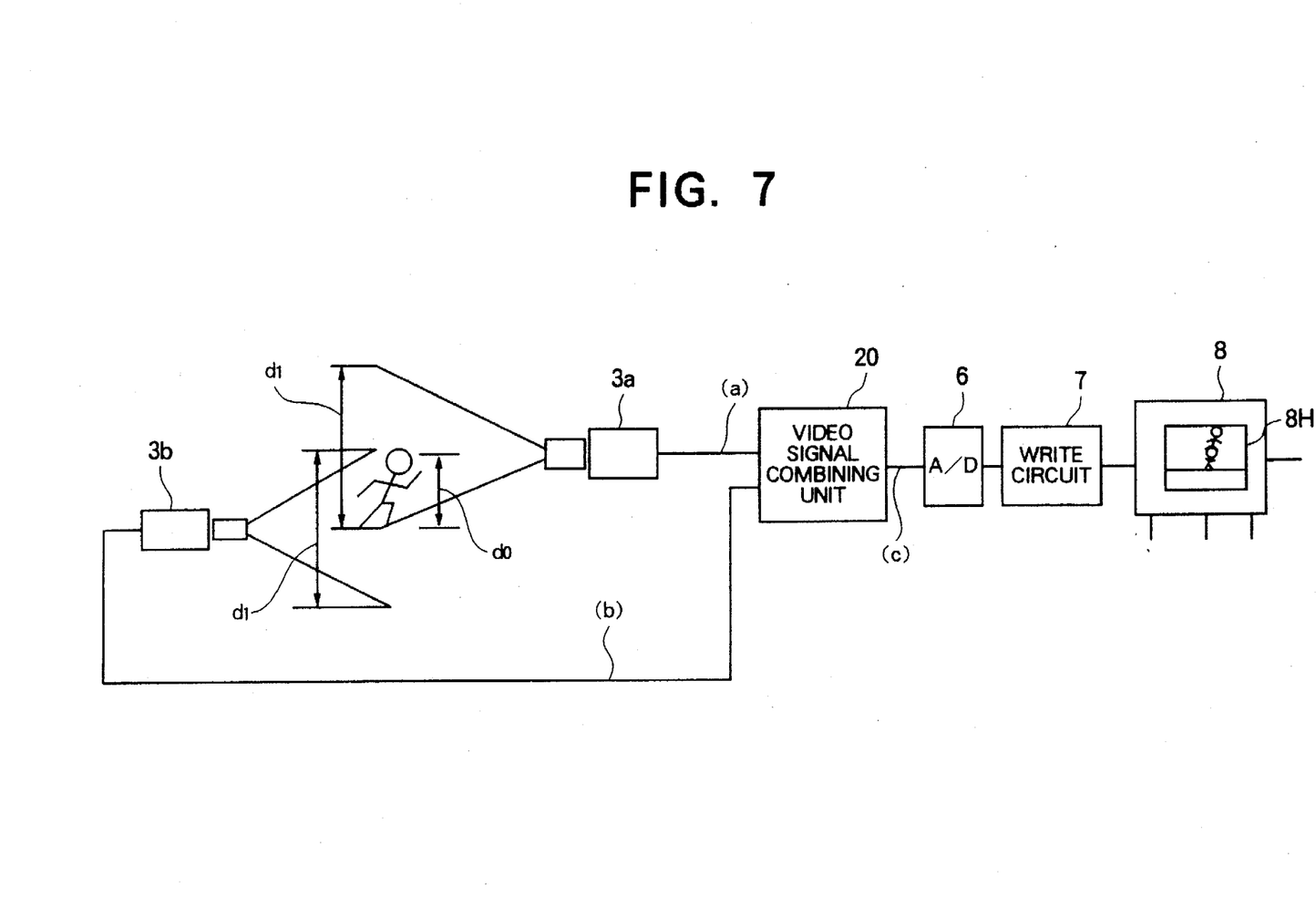
FIG. 7 is a block diagram of an order-of-arrival and time judging apparatus according to the present invention, using a video signal combining unit according to the present invention, with a diagram illustrating the operation of a display bisected into an upper half and a lower half.
Figure 8A:
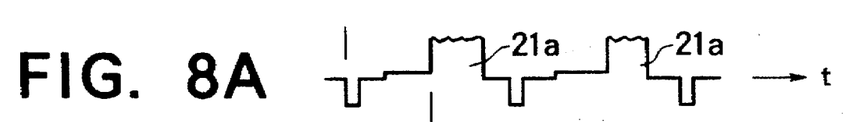
FIGS. 8A through 8D are diagrams illustrating the operation of the embodiment shown in FIG. 7.
Figure 8B:
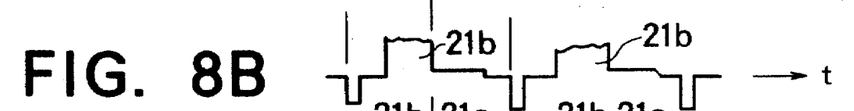

The outfield line sensor camera 3a and the infield line sensor camera 3b are disposed so as to pick up images of the moving object from both directions with the judgment criterion line between and in mutually different height positions as shown in FIG. 7. If images of the moving object are picked up by two line sensor cameras so as to be located in the upper half for one of the two line sensor cameras and located in the lower half for the other of the two line sensor cameras, the video signal obtained from the outfield line sensor camera and the video signal obtained from the infield line sensor camera become signals, for example, as shown in FIG. 8A and 8B, respectively. Scanning of the line sensor in line sensor cameras is effected from the top to the bottom.

Figure 8C:
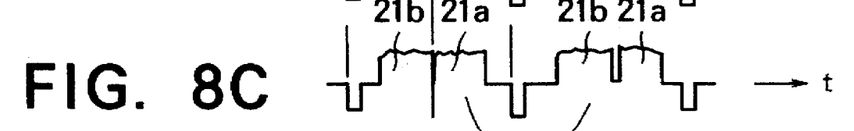
Figure 8D:
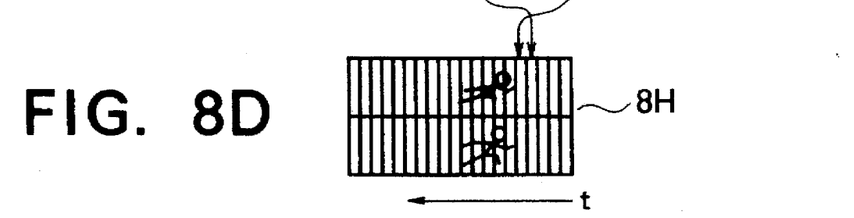

If video signals having signals levels of the moving object respectively in the former half and the latter half of one vertical scanning interval as shown in FIGS. 8A and 8B are combined in a video signal combining unit 20, a video signal as shown in FIG. 8C is obtained.

By storing this video signal in an image memory 8H, a bisected image nearly equivalent to the above described image divided into the upper part and the lower part is obtained. As for the information signal, it is recorded in the same way as the embodiment of FIG. 5.

In the foregoing description, two line sensor cameras are disposed at different heights so as to have parallel optical axes displaced in the vertical direction, and images of the moving object are picked up by two line sensor cameras so as to be located in the upper half for one of the two line sensor cameras and located in the lower half for the other of the two line sensor cameras. Instead, the angle of view of pickup may be divided with a ratio of 1/3 to 2/3 to increase the ratio of the primary image to 2/3.

This order-of-arrival and time judging apparatus can be implemented by adding the video signal combining unit 20 to the conventional order-of-arrival and time judging apparatus. Therefore, this apparatus is practical means in the case where video signals of a plurality of cameras are to be stored most inexpensively.

The present invention makes it possible to provide an inexpensive order-of-arrival and time judging apparatus, capable of storing, in a memory unit, video signals of a plurality of line sensor cameras disposed so as to be able to pick up images of moving objects from both directions with a judgment criterion line such as a goal line between or from such angles that moving objects do not overlap, effecting scan conversion on the stored video signals of the plurality of line sensor cameras, reading resultant video signals, and displaying video signals thus read out respectively singly or simultaneously plurally on a single display unit such as a single video monitor, and capable of implementing unitary administration of images for judgment in a single image filing unit and a single video printer, and forming a judgment as to the order of arrival of racers at a goal in a race and the time taken for the race accurately, positively and easily.

We claim:

1. An apparatus for judging the order of arrival of racers at a judging criterion line in a race and time taken for the race, said apparatus comprising:

at least two line sensor cameras disposed opposite to each other over said judging criterion line so as to pick up images of moving objects passing through said judging criterion line;

a memory unit for storing respective video signals supplied from said respective line sensor cameras successively in time series;

an operating unit for specifying ranges of said respective video signals to be stored in said memory unit and specifying ranges of signals to be read out of said respective video signals stored in said memory unit;

readout means for effecting scan conversion on all or a part of video signals specified by said operating unit out of said respective video signals stored in said memory unit and reading out resultant video signals; and video monitor means for simultaneously displaying said respective video signals from said respective line sensor cameras read out by said readout means.

2. An apparatus according to claim 1, further comprising:

a plurality of A/D converters for effecting A/D conversion respectively on video signals picked up by said at least two line sensor cameras; and a plurality of write circuits for writing a plurality of digital video signals obtained by A/D conversion effected in said A/D converters into said memory unit.

3. An apparatus according to claim 2, further comprising:

an address controller for specifying addresses of said memory unit in which said digital video signals supplied from said write circuits should be written.

4. An apparatus according to claim 1, further comprising:

a time generator for generating time information to be stored and read out simultaneously with storing and reading out said video signals.

5. An apparatus according to claim 4, wherein said monitor means displays at least one of time information data outputted by said time generator corresponding to the generation of said video signals.

6. An apparatus according to claim 1, further comprising:

a character generator for generating character information, relating to the race, to be stored and read out simultaneously with storing and reading out said video signals.

7. An apparatus according to claim 1, wherein said at least two line sensor cameras are simultaneously operational.

8. An apparatus according to claim 1, wherein said line sensor cameras are disposed in mutually different height positions so that optical axes of said at least two line sensor cameras are in parallel.

9. An apparatus according to claim 1, wherein said readout means reads out said video signals which are picked up by said at least two line sensor cameras and stored in said memory unit, so that the video signals are displayed either on upper and lower parts or on left and right parts, respectively.

10. An apparatus according to claim 1, wherein said video signals read out by said readout means are displayed in the manner that time axes of said video signals displayed are identical with each other.

11. An apparatus for judging the order of arrival of racers at a judging criterion line in a race and time taken for the race, said apparatus comprising:

two line sensor cameras disposed opposite each other over said judging criterion line so as to pick up images of moving objects passing through said judging criterion line in mutually different scanning regions from both directions with said judging criterion line;

a memory unit for combining two video signals supplied from said two line sensor cameras so as to be housed in the scanning regions and storing the combined video signals respectively successively in a time series;

an operating unit for specifying ranges of said video signals to be stored in said memory unit and specifying ranges of signals to be read out of said video signals stored in said memory unit;

readout means for effecting scan conversion on said combined video signals existing in the ranges specified by said operating unit out of said combined video signals stored in said memory unit and reading out resultant combined video signals; and a video monitor for displaying the combined video signals read out by said readout means.

12. An apparatus according to claim 11, further comprising:

two A/D converters for effecting A/D conversion respectively on video signals picked up by said two line sensor cameras; and two write circuits for writing two digital video signals obtained by A/D conversion effected in said A/D converters into said memory unit.

13. An apparatus according to claim 12, further comprising:

an address controller for specifying addresses of said memory unit in which said digital video signals supplied from said write circuits should be written.

14. An apparatus according to claim 11, further comprising:

a time generator for generating time information to be stored and read out simultaneously with storing and reading out said video signals.

15. An apparatus according to claim 14, wherein said monitor means displays at least one of time information data outputted by said time generator corresponding to the generation of said video signals.

16. An apparatus according to claim 11, further comprising:

a character generator for generating character information, relating to the race, to be stored and read out simultaneously with storing and reading out said video signals.

17. An apparatus according to claim 11, wherein said two line sensor cameras are simultaneously operational.

18. An apparatus according to claim 11, wherein said two line sensor cameras are disposed mutually different height positions so that two optical axes of said two line sensor cameras are in parallel.

19. An apparatus according to claim 11, wherein said readout means reads out said video signals which are picked up by said two line sensor cameras and stored in said memory unit, so that the video signals are displayed either on upper and lower parts or on left and right parts, respectively.

20. An apparatus according to claim 11, wherein said video signals read out by said readout means are displayed in the manner that time axes of said video signals displayed are identical with each other.

21. An apparatus for judging the order of arrival of racers at a judging criterion line in a race and time taken for the race, said apparatus comprising:

at least two line sensor cameras disposed opposite to each other over said judging criterion line so as to pick up images of moving objects passing over said judging criterion line, each of said at least two line sensor cameras being disposed at about a same distance from at least a predetermined portion of said judging criterion line;

a memory unit for storing respective video signals supplied from said respective line sensor cameras successively in time series;

an operating unit for specifying ranges of said respective video signals to be stored in said memory unit and specifying ranges of signals to be read out of said respective video signals stored in said memory unit;

readout means for effecting scan conversion on all or a part of video signals specified by said operating unit out of said respective video signals stored in said memory unit and reading out resultant video signals; and video monitor means for simultaneously displaying said respective video signals from said respective line sensor cameras read out by said readout means.

* * * * *